Oct. 19, 1926.  
J. B. BEVERIDGE  
1,603,507  
PROCESS AND APPARATUS FOR FILTERING WOOD PULP  
Filed Jan. 16, 1926
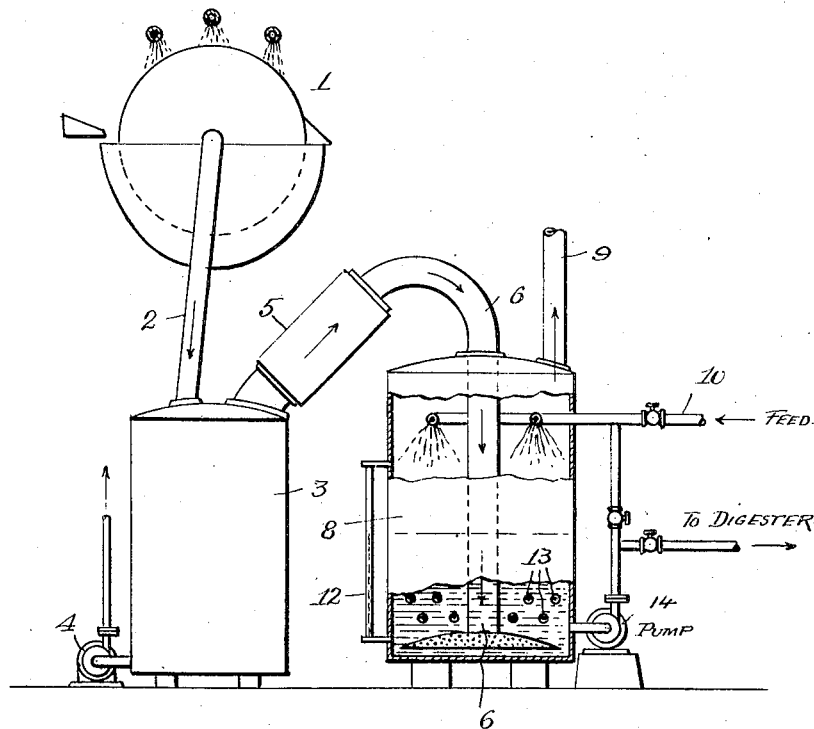

Patented Oct. 19, 1926.

1,603,507

UNITED STATES PATENT OFFICE.

JAMES BROOKES BEVERIDGE, OF RICHMOND, VIRGINIA.

PROCESS AND APPARATUS FOR FILTERING WOOD PULP.

Application filed January 16, 1926. Serial No. 81,760.

In the process of separating the waste alkali (black) liquor from the fibers in the alkaline (soda and sulphate) processes of manufacturing pulp by filtration and washing on rotary filters, or other filters in which a suction is used, there is a considerable amount of foam or froth produced in the separator or vessel in which the black liquor and washings from the filter are separated from the air. My invention relates to a method of destroying this foam (or froth) to prevent it passing to the air-pump which in practice maintains the necessary suction on the filter and to recover in utilizable form the chemical carried in the foam.

In carrying out my invention in practice, I draw off the air and foam from the separator, as usual, and pass them first through a cooler to partly condense the aqueous vapor and secondly through a solution of (white liquor) sodium hydroxide or of a mixture of sodium hydroxide and sodium sulphide, or other sodium salts in a separate vessel, which removes the foam and allows the air to pass to the air-pump in a comparatively dry state, thus preventing the loss of alkali. The alkaline liquor used for this purpose is afterwards used for cooking the wood or other fibrous substances to convert same into pulp. For this purpose, I interpose preferably both a cooler (preferably of the surface-condensing type) and an absorbing vessel containing the alkaline soda liquor between the separating vessel and the air-pump. Also, if found necessary, a vessel or scrubber may be arranged between the vessel containing the alkaline solution and the air-pump, to remove any alkaline solution which may be carried over to the air-pump by the air.

The accompanying drawing shows the general arrangement of an apparatus of preferable construction. 1 represents the rotary filter of any of the known vacuum types; 2, the pipe conveying the air and waste (black) alkaline liquor to the separator 3 of the usual form. The bulk of the black liquor falls to the bottom of the separator 3 and is drawn off by the pump 4 and conveyed to the recovery-house to recover the soda therefrom for re-use, as usual, or a portion may be used for diluting the pulp as it is fed to the rotary filter as usual. The air from the separator 3 carries with it aqueous vapor and foam containing alkali, all three of which are conducted into a cooler 5 of a usual type. When the bulk of the water vapor is condensed in the cooler 5, the condensate runs back into the separator 3 or into a tank 8 through a pipe 6, as desired, while the comparatively dry air with the foam passes down the pipe 6 (the lower end of which is bell-shaped and perforated with holes about one inch in diameter) into the vessel 8, and from thence through the pipe 9 to the air or vacuum pump. The vessel 8 contains an alkaline digesting liquor (white liquor) which may be a solution of sodium hydroxide, or the mixture of sodium hydroxide and sodium sulphur salts, up through which the air in comminuted form is made to pass before it goes to the vacuum pump. The alkaline solution is fed from any convenient storage tank through the pipe 10 to the vessel 8, in such quantity or manner that a nearly constant depth of liquid is maintained in 8, as shown on the glass gauge 12.

The solution of sodium hydroxide or sodium hydroxide and sodium salts may of course be maintained in circulation in vessel 8 by means of a pump 14. The whole apparatus of course operates under reduced atmospheric pressure, and I find it advantageous to keep the temperature of the liquid in vessel 8 as low as possible. To this end, a cold water coil 13 may be placed in the solution contained in vessel 8 with which the temperature can be regulated. In place of the vessel 8, any other type of spray washer or scrubber may be used.

What I claim as new is:

1. In processes of filtering wood pulp made by the alkali method, in which alkali-laden foam is produced, the step of breaking down the foam and catching the alkali in said foam consisting in passing the foam-laden air through a liquid bath on its way to the pump.

2. In processes of filtering wood pulp made by the alkali method, in which alkali-laden foam is produced, the step of breaking down the foam and catching the alkali in said foam consisting in passing the foam-laden air through a liquid bath on its way to the pump, said bath being an alkaline digesting liquor.

3. In processes of filtering wood pulp made by the alkali method, in which the exhausting air carries alkali-laden foam, the steps of first cooling the alkali-laden air to thus partly condense out the liquid carried thereby, and then passing the foam-laden air through a bath of alkaline digesting liquor, both these steps being carried out before the air reaches the suction-pump.

4. An apparatus of the class herein set forth consisting of a vacuum filtering apparatus for filtering wood pulp made by the alkali process, a cooler interposed between the separator and the exhausting pump, a bath of alkaline liquor between the cooler and said pump, and means whereby the foam-laden air is caused to pass upwardly through said bath on its way to the pump.

5. An apparatus of the class herein set forth consisting of a vacuum filtering apparatus for filtering wood pulp made by the alkali process, a cooler interposed between the separator and the exhausting pump, a bath of alkaline liquor between the cooler and said pump, and means whereby the foam-laden air is caused to pass upwardly through said bath on its way to the pump, means being provided whereby the level of the said alkaline digesting bath may be maintained by supplying fresh liquor and withdrawing the concentrated liquor.

In testimony whereof I hereunto affix my signature.

JAMES BROOKES BEVERIDGE.